Dec. 27, 1932.  G. H. WALKER  1,892,295
APPARATUS FOR ABSORBING AND MEASURING THE POWER DEVELOPED BY PRIME MOVERS
Filed June 16, 1930  4 Sheets-Sheet 1
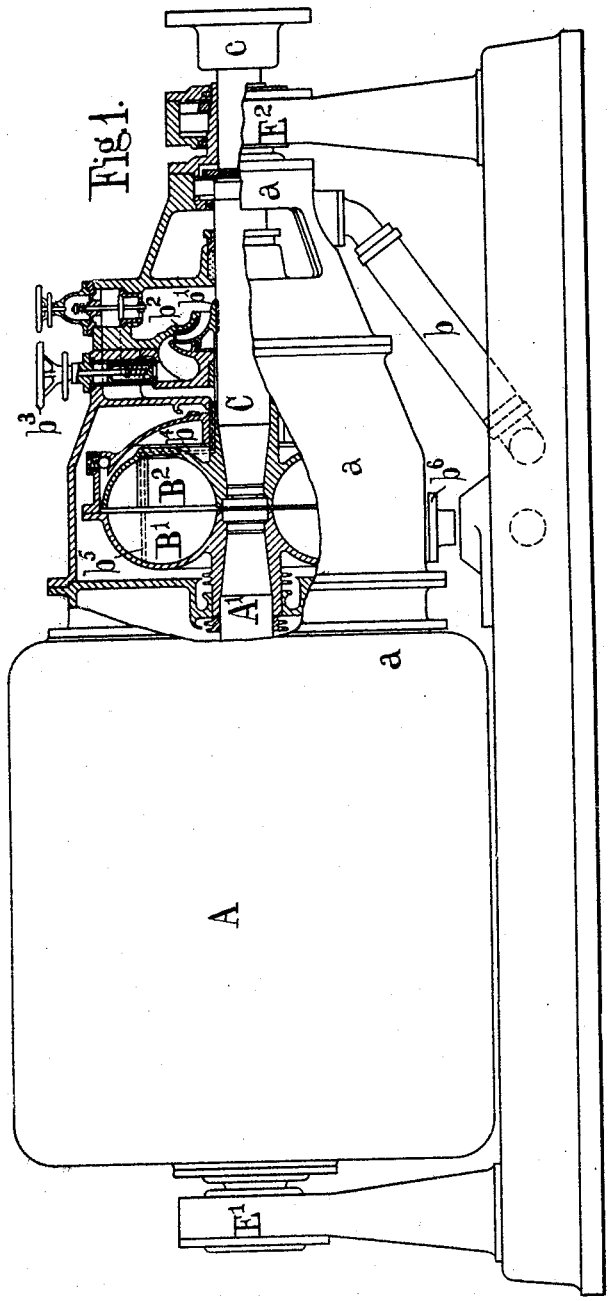
INVENTOR.
George H. Walker Dec. 27, 1932. G. H. WALKER 1,892,295
APPARATUS FOR ABSORBING AND MEASURING THE POWER DEVELOPED BY PRIME MOVERS
Filed June 16, 1930 4 Sheets-Sheet 2
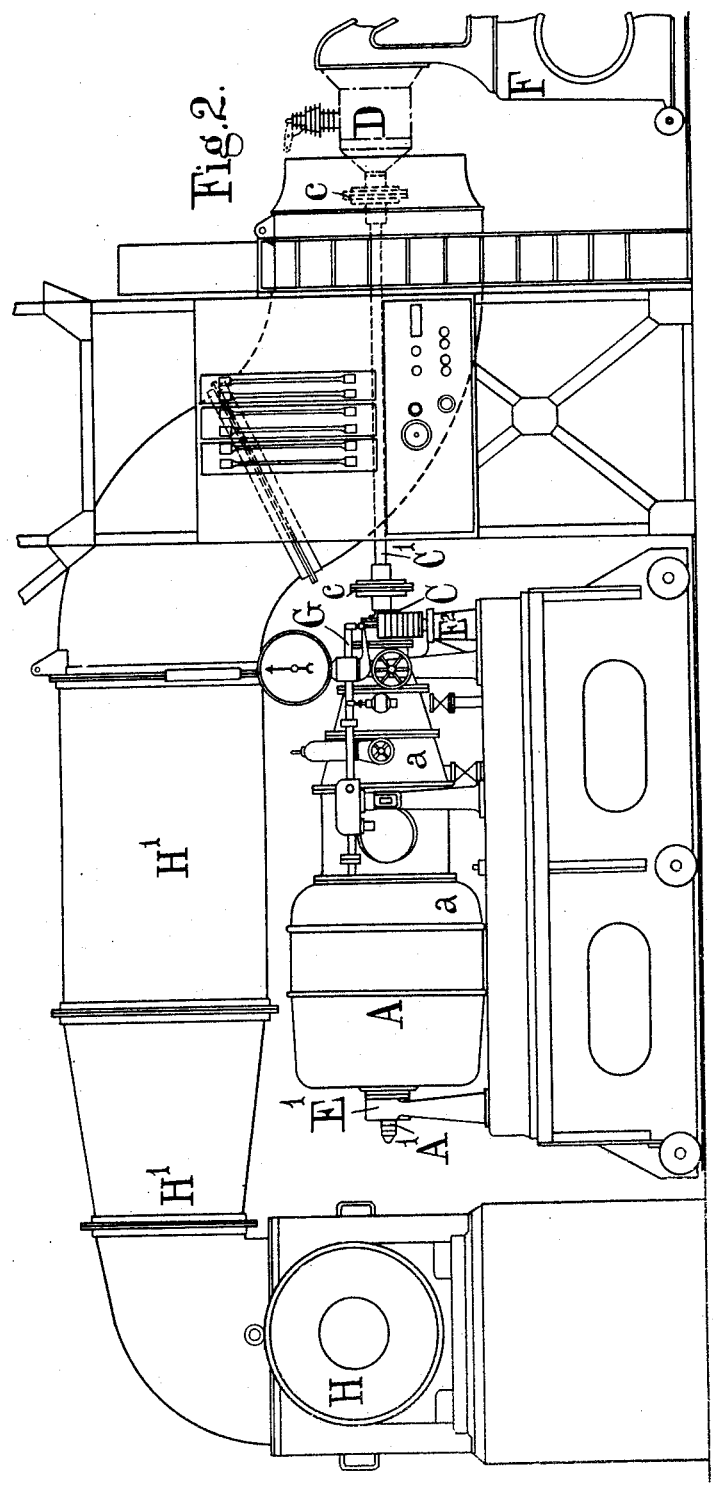
INVENTOR.
George H. Walker
by
Dowden O'Brien
atty.

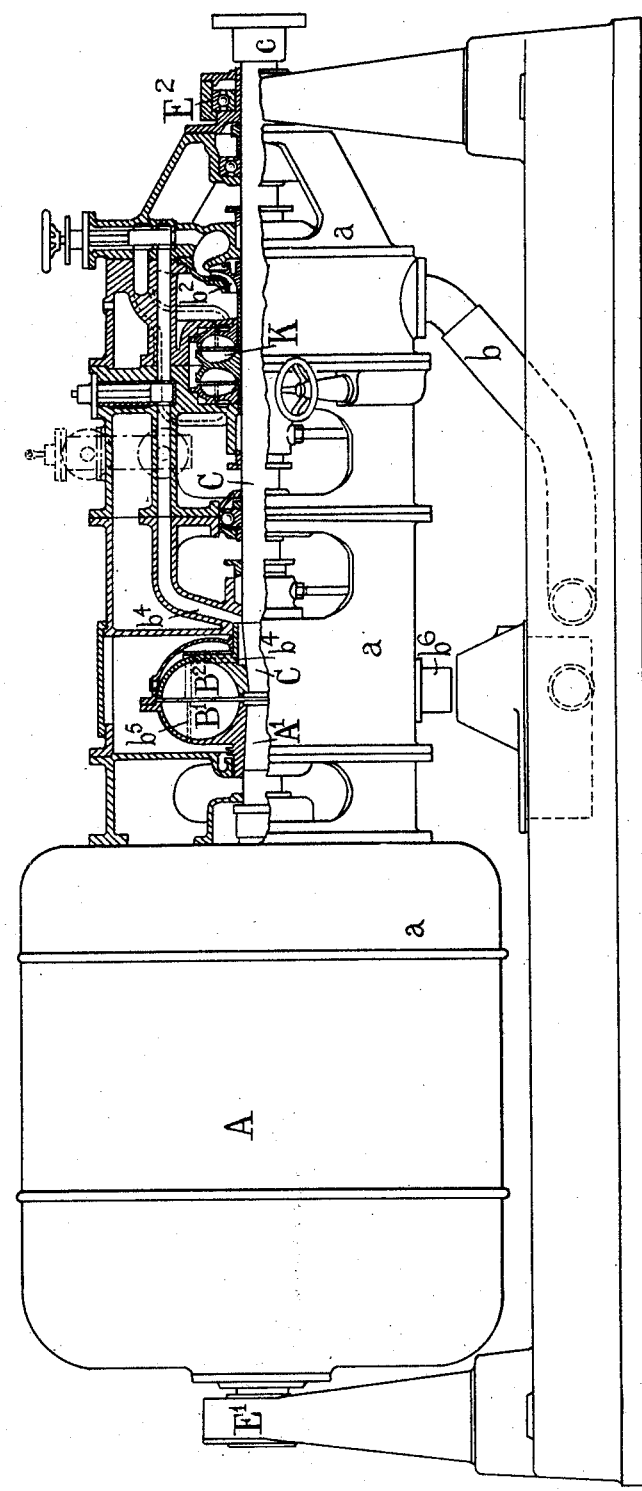

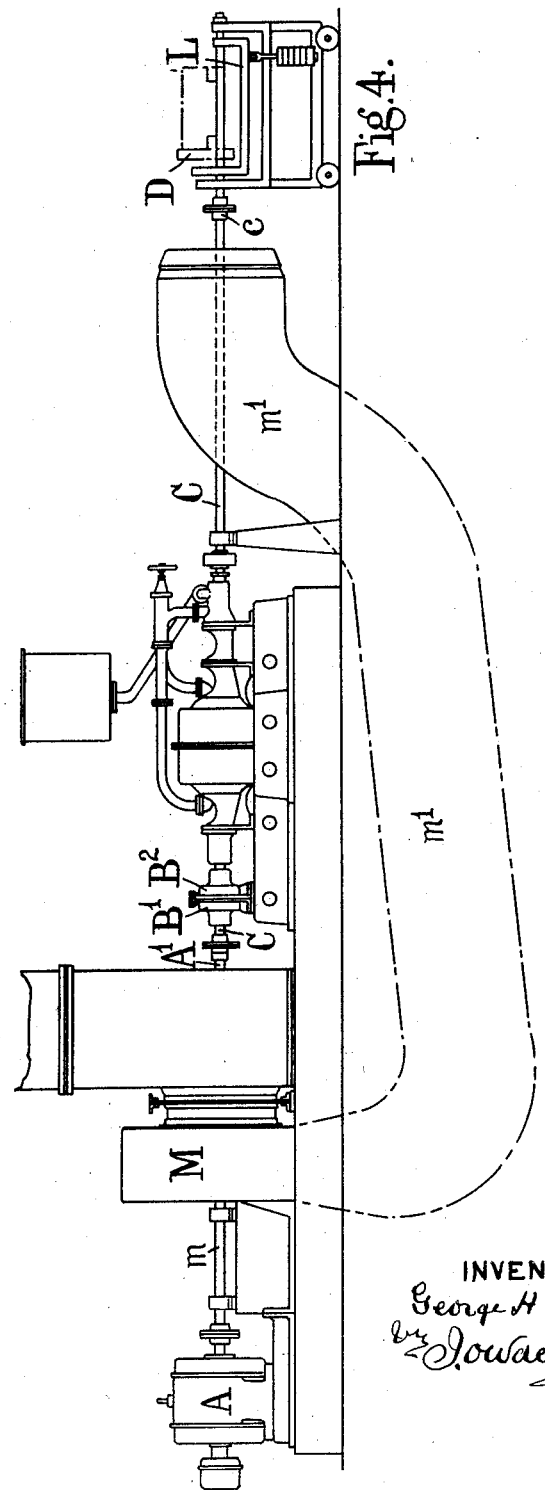

Patented Dec. 27, 1932

1,892,295

UNITED STATES PATENT OFFICE

GEORGE HENRY WALKER, OF WORCESTER, ENGLAND, ASSIGNOR TO HEENAN & FROUDE LIMITED, OF WORCESTER, ENGLAND

APPARATUS FOR ABSORBING AND MEASURING THE POWER DEVELOPED BY PRIME MOVERS

Application filed June 16, 1930, Serial No. 461,611, and in Great Britain August 13, 1929.

This invention relates to improvements in means for absorbing and measuring the power of engines and other prime movers.

According to the invention the power of the prime mover is absorbed by a dynamo electric machine capable of functioning either as a motor or a generator, a slipping clutch such as an hydraulic clutch or hydraulic torque transformer or equivalent device being interposed between the prime mover and the dynamo electric machine.

The slipping clutch is preferably provided with means whereby the degree of slip between the prime mover and the dynamo electric machine can be varied within wide limits and the will of the operator.

The invention will be described with reference to the accompanying drawings:—

Fig. 1 is a side elevation partly in section of one form of the invention showing the prime mover, hydraulic clutch and dynamo electric machine mounted in tandem.

Fig. 2 is a side elevation partly in section of a similar form of the invention to that shown in Fig. 1 showing the general arrangement of mounting of the prime mover, hydraulic clutch and dynamo electric machine together with means driven from the dynamo electric machine when functioning as a generator for supplying cooling air to the prime mover under test.

Fig. 3 is a side elevation partly in section of another form of the invention.

Fig. 4 is a side elevation of a further form of the invention in which the prime mover under test is mounted on a torque reaction cradle or table.

Referring to the form of the invention shown in Figs. 1 and 2 the casing or carcase $a$ of a swinging frame dynamo-electric machine A is extended to form a housing for the two members $B^1$, $B^2$ of a slipping clutch one member $B^1$ of which is affixed on the shaft $A^1$ of the dynamo-electric machine A and the other on a shaft C provided at the end with a coupling $c$ adapted to be connected either directly or through an intermediate shaft $C^1$ (see Fig. 2) with the shaft of the prime mover D being tested. The dynamo-electric machine A is constructed so as to be capable of functioning either as a motor or a generator.

The slipping clutch $B^1$, $B^2$ is of such a type that the degree of slip between the two members can be varied at will over a wide range of speed so that while the shaft $A^1$ of the dynamo-electric machine A can run at a substantially constant speed, the primary shaft C may run at a variable speed and allow the engine D coupled thereto to be tested over a wide range of speed.

Any suitable form of slipping clutch complying with the above mentioned requirements may be employed but it is preferred to use a clutch of the hydraulic type. One form of such clutch is described in the specification of prior Patent No. 1,784,212 dated December 9, 1930. The clutch illustrated in the drawings is however the hydraulic clutch forming the subject matter of a concurrent application for patent Serial No. 461,610 filed June 16, 1930. In this clutch under running conditions water is admitted through the flexible hose $b$ to the water space $b^1$ and is caught up by the centrifugal pump $b^2$ the discharge from which is controlled by a hand wheel $b^3$. Water then passes through passages $b^4$ into the power transmitting elements $B^1$, $B^2$ of the clutch which transmits torque by hydraulic interaction between the two elements and in doing so develop a pressure of water some of which escapes through the hot water discharge outlet $b^5$.

Air vents $b^2$, the function of which is described in application Serial No. 462,610 connect the external atmosphere with the cavity which is usually formed in the centre of the vortex created by the transmission of power. The degree of slip is regulated by permitting the cavity to expand or contract, thereby altering the amount of water contained in the power transmitting elements. This function is in turn regulated by the rate at which water is admitted through the main control valve operated by the hand wheel $b^3$.

When the machine is at rest, the automatic de-clutching valve is pushed off its seat by a spring, enabling water to flow out of the clutch which thereupon empties itself.

On starting up, the valve flies out under the influence of centrifugal force and closes the outlet of the de-clutching valve.

The shafts $A^1$ and C are mounted on anti-friction trunnions $E^1$, $E^2$ so that the dynamo-electric machine and the clutch assembly are carried thereon. Thus any torque resisting rotation of the primary shaft C reacts upon the casing, or casings of the dynamo electric machine and the clutch and if the latter is connected to a weighing machine G described and shown in a catalogue S. 80 published by Heenan & Froude Limited, of Worcester, England, in January, 1926, the torque developed by the prime mover which is connected to the primary shaft C through the coupling c will be indicated by such weighing mechanism.

Contrarily, any torque leaving the primary shaft for the purpose of overcoming an external resistance such as is created by an engine undergoing a running-in process, also reacts on the same weighing machine and can be measured thereby. The torque may be transferred from the primary shaft to the generator shaft or vice versa, by means of the slipping clutch.

The dynamo electric machine A may be either of the alternating or direct current pattern connected electrically to any convenient electrical circuit such as the main supply of the works in which the tests are conducted.

In conducting a test the engine or other prime mover D is mounted on the test bed F and connected to the coupling c on the end of the primary shaft C. Current is then supplied to the dynamo electric machine A which acts as a motor and the slipping clutch $B^1$, $B^2$ transmits a small amount of power sufficient to run in or start up the engine D.

As soon as the latter is in a suitable condition to develop power fuel is admitted and the engine D is allowed to drive the slipping clutch $B^1$, $B^2$ which is gradually adjusted to transmit more and more power until the desired load is imposed upon the engine at the requisite speed.

As a result of this procedure the inflow of electric current to the dynamo electric machine A gradually diminishes, becomes nil, and finally current is generated. The current thus generated may be returned to the circuit or it may be used for any other separate purpose. Thus in carrying out tests on air cooled engines such as those used on aircraft, the current generated after the engine has been run in can be employed for driving a motor H (Fig. 2) which drives a fan arranged in an air duct $H^1$ and which delivers the cooling air on to or around the engine D. The air duct $H^1$ is carried at the end adjacent the prime mover D on a framing which may also carry a switch board.

The general arrangement of the form of the invention shown in Fig. 3 is similar to that already described with reference to Figs. 1 and 2. In this form however a hydraulic dynamometer or brake K described and shown in a catalogue S. 80 published by Heenan & Froude Limited, of Worcester, England, in January, 1926, is mounted on the primary shaft C between the slipping clutch $B^1$, $B^2$ and the coupling c by which the shaft C is coupled to the shaft of the prime mover. The employment of the hydraulic brake or dynamometer K between the clutch and the prime mover enabling power to be absorbed and measured when the engine under test is running at lower speeds of rotation than the speed fixed by the normal running speed of the dynamo electric machine.

Fig. 4 of the drawings illustrates an arrangement in which the casing of the slipping clutch is so mounted that it is fixed and has no rotary or oscillating movement, the clutch $B^1$ $B^2$ being used only as a slipping clutch for connecting the shaft of the prime mover D with the dynamo electric machine. In this arrangement the engine D is carried on a torque table or cradle L of any suitable type which is fitted with the usual weighing devices. In the particular construction illustrated in Fig. 4 a fan M is mounted on an auxiliary shaft m between the clutch $B^1$, $B^2$ and the dynamo electric machine A and this fan supplies air through the wind tunnel or duct $m^1$ to the engine D such arrangement being particularly applicable for use in testing air cooled aircraft engines. The power developed by the engine after it has been run in is transmitted by the hydraulic clutch $B^1$, $B^2$ simultaneously to the fan M and to the dynamo electric machine A while the torque reaction is measured by the torque table. Part of the engine power is thus transmitted by the clutch to the fan which discharges a current of air at high velocity over the heat radiating portions of the engine D, while the balance of engine power is utilized to drive the dynamo electric machine A acting as a generator.

What I claim as my invention and desire to protect by Letters Patent is:—

1. Means for absorbing and measuring the power developed at the shaft of an engine or other prime mover comprising a dynamo electric machine, a slipping hydraulic clutch interposed between the shaft of the prime mover and the dynamo electric machine and weighing mechanism to register any torque resisting rotation of the shaft.

2. Means for absorbing and measuring the power developed at the shaft of an engine or other prime mover comprising a dynamo electric machine, a slipping clutch interposed between the prime mover and the dynamo electric machine, means whereby the degree of slip between the shaft of the prime mover and the dynamo electric machine can be varied as desired within wide limits and weighing mechanism to register any torque resisting rotation of the shaft.

3. Means for absorbing and measuring the power of engines and other prime movers comprising a dynamo electric machine, a slipping clutch interposed between the prime mover and the dynamo electric machine, means whereby the degree of slip between the prime mover and the dynamo electric machine can be varied as desired within wide limits, trunnions by which the dynamo electric machine and the clutch are carried, weighing mechanism to register any torque resisting rotation of the shaft connected to the prime mover.

4. Means for absorbing and measuring the power of engines and other prime movers comprising a dynamo electric machine, a slipping clutch interposed between the prime mover and the dynamo electric machine, means whereby the degree of slip between the prime mover and the dynamo electric machine can be varied as desired within wide limits, trunnions by which the dynamo electric machine and the clutch are carried, weighing mechanism to register any torque resisting rotation of the shaft connected to the prime mover, and a brake arranged between the slipping clutch and the prime mover for the purpose of absorbing power at engine speeds lower than the normal running speed of the dynamo-electric machine.

5. Means for absorbing and measuring the power of engines and other prime movers comprising a dynamo electric machine, a slipping clutch interposed between the prime mover and the dynamo electric machine, means whereby the degree of slip between the prime mover and the dynamo electric machine can be varied as desired within wide limits, trunnions by which the dynamo electric machine and the clutch are carried, weighing mechanism to register any torque resisting rotation of the shaft connected to the prime mover, a fan arranged between the slipping clutch and the dynamo electric machine to absorb part of the power developed by the engine under test and deliver cooling air thereto and air passages by which the air is led to the engine.

In testimony whereof I have hereunto set my hand this 23rd day of May, 1930.

GEORGE HENRY WALKER.